(12) United States Patent
Jarosinski et al.

(10) Patent No.: US 10,890,649 B2
(45) Date of Patent: Jan. 12, 2021

(54) SYSTEM AND METHOD FOR MEASURING REFERENCE AND RETURNED LIGHT BEAMS IN AN OPTICAL SYSTEM

(71) Applicant: QUALCOMM Incorporated, San Diego, CA (US)

(72) Inventors: Tadeusz Jarosinski, San Diego, CA (US); Volodimir Slobodyanyuk, San Diego, CA (US); John Wyrwas, Mountain View, CA (US); Manav Raina, San Diego, CA (US); Elbert McLaren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 665 days.

(21) Appl. No.: 15/235,041

(22) Filed: Aug. 11, 2016

(65) Prior Publication Data

US 2018/0045816 A1 Feb. 15, 2018

(51) Int. Cl.
*G01S 7/48* (2006.01)
*G01S 7/481* (2006.01)
*G01S 17/42* (2006.01)
*G01S 7/4863* (2020.01)
*G01S 17/06* (2006.01)

(52) U.S. Cl.
CPC .......... *G01S 7/4814* (2013.01); *G01S 7/4817* (2013.01); *G01S 7/4863* (2013.01); *G01S 17/06* (2013.01); *G01S 17/42* (2013.01)

(58) Field of Classification Search
CPC ...... G01S 7/4816; G01S 7/4817; G01S 7/486; G01S 7/4863

USPC ................................................ 356/3.01–5.15
See application file for complete search history.

(56) References Cited

U.S. PATENT DOCUMENTS

| 5,727,098 A | * | 3/1998 | Jacobson | G02B 26/10 |
| | | | | 385/22 |
| 6,249,591 B1 | * | 6/2001 | Tullis | G01D 5/305 |
| | | | | 382/106 |
| 7,202,898 B1 | * | 4/2007 | Braun | G01C 3/08 |
| | | | | 250/559.08 |
| 7,262,402 B2 | | 8/2007 | Niclass et al. | |

(Continued)

OTHER PUBLICATIONS

International Search Report and Written Opinion—PCT/US2017/041578—ISA/EPO—dated Oct. 20, 2017.

*Primary Examiner* — Luke D Ratcliffe
(74) *Attorney, Agent, or Firm* — Weaver Austin Villeneuve & Sampson LLP

(57) ABSTRACT

Disclosed herein are techniques for measuring a reference beam and a corresponding returned beam from a target in a measurement system using a single sensor array. The system is configured such that the location of the reference beam is space apart from the location of the returned beam on the sensor array. A first set of sensor elements on the sensor array corresponding to the reference beam is dynamically activated based on a laser beam scanning control signal. The detection signal from the first set of sensor elements is used to determine a location and/or a pattern of the reference beam, which are then used to estimate a location and/or a pattern of the corresponding returned beam on the same sensor array and dynamically select and activate a second set of sensor elements on the sensor array based on the estimated location and/or pattern of the corresponding returned beam.

30 Claims, 8 Drawing Sheets

(56) References Cited

U.S. PATENT DOCUMENTS

| | | | |
|---|---|---|---|
| 8,885,150 B2* | 11/2014 | Pellemans | G03F 7/70633 |
| | | | 356/4.01 |
| 9,997,551 B2* | 6/2018 | Mandai | H01L 27/14609 |
| 2005/0018264 A1* | 1/2005 | Benedict | G02B 26/10 |
| | | | 359/196.1 |
| 2007/0076189 A1 | 4/2007 | Kumagai et al. | |
| 2011/0176146 A1 | 7/2011 | Alvarez Diez et al. | |
| 2012/0044093 A1* | 2/2012 | Pala | G01S 7/4863 |
| | | | 340/963 |
| 2012/0182541 A1* | 7/2012 | Canham | G01C 3/08 |
| | | | 356/5.01 |
| 2013/0300838 A1 | 11/2013 | Borowski | |
| 2013/0314694 A1* | 11/2013 | Tchoryk, Jr. | G01N 21/45 |
| | | | 356/28.5 |
| 2014/0049783 A1 | 2/2014 | Royo et al. | |
| 2014/0071433 A1* | 3/2014 | Eisele | G01S 7/481 |
| | | | 356/5.01 |
| 2014/0078491 A1 | 3/2014 | Eisele et al. | |
| 2014/0191114 A1* | 7/2014 | Russo | G01S 17/08 |
| | | | 250/208.2 |
| 2016/0127664 A1 | 5/2016 | Bruder et al. | |
| 2017/0242108 A1* | 8/2017 | Dussan | G01S 7/4863 |
| 2018/0045817 A1* | 2/2018 | Yeo | G01S 7/4817 |
| 2018/0341009 A1* | 11/2018 | Niclass | G01S 7/4817 |

* cited by examiner

SYSTEM AND METHOD FOR MEASURING REFERENCE AND RETURNED LIGHT BEAMS IN AN OPTICAL SYSTEM

BACKGROUND

A light detection and ranging (LIDAR) system is an active remote sensing system that can use light beams to obtain the range, i.e., distance, from a source to one or more points on a target. A LIDAR system uses a light beam (typically a laser beam) to illuminate at least a portion of the target and measures the time it takes for the emitted light beam from the source to arrive at the target and then return to a detector near the source or at a known location. In other words, the range from the source to the point on the target can be determined based on the time-of-flight (ToF) of the light beam from the source to the detector. To measure ranges to multiple points on a target or in a field-of-view of the LIDAR system, the laser beam is usually scanned in one or two dimensions. In various implementations of the LIDAR system, it may be desirable to determine the position, timing, and/or intensity of a reference laser beam and the corresponding returned beam in order to determine the ranges from the source to the points on the target.

BRIEF SUMMARY

Techniques disclosed herein relate to measuring a reference beam and a corresponding returned beam from a target in a LIDAR system or other like system using a single sensor array. In various embodiments, a first set of sensor elements on the sensor array corresponding to the reference beam may be dynamically selected and activated based on a laser beam scanning control signal. The detection signal from the first set of sensor elements may be used to determine a location and/or a pattern of the reference beam, which may then be used to estimate a location and/or pattern of the corresponding returned beam on the same sensor array. A second set of sensor elements of the sensor array may then be dynamically selected and activated based on the estimated location and/or pattern of the corresponding returned beam. In this way, the timings, locations, and/or intensities of the reference beam and the returned beam can be measured by a single sensor array, thereby increasing accuracy and reliability of the system. Furthermore, because only a dynamically selected set of sensor elements corresponding to the reference beam or a dynamically selected set of sensor elements corresponding to the returned beam may be activated at a particular time, the interference between the reference beam and the returned beam and noises caused by, for example, background radiation or stray (scattered) light beams on other sensor elements of the sensor array, can be reduced or eliminated.

In accordance with an example implementation, a system may include a light source configured to transmit a light beam, a two-dimensional (2-D) sensor array including a plurality of sensor elements, and a beam splitting device configured to direct a first portion of the light beam onto a first area on the 2-D sensor array. The system may also include a transmitter optical subsystem configured to direct a second portion of the light beam towards a target object, and a receiver optical subsystem configured to direct a returned portion of the second portion of the light beam reflected by the target object onto a second area on the 2-D sensor array, where the second area is spaced apart from the first area. The system may further include a sensor controller communicatively coupled to the 2-D sensor array for controlling the 2-D sensor array. In some embodiments, the first area and the second area are on opposite sides of the 2-D sensor array.

In some embodiments of the system, the sensor controller may be configured to selectively activate a first set of sensor elements of the 2-D sensor array in a first estimated area including the first area, based on a laser beam scanning control signal that controls a scanning direction of the transmitted light beam; receive a detection signal from the first set of sensor elements; deactivate the first set of sensor elements after receiving the detection signal; and determine an actual location of the first portion of the light beam on the 2-D sensor array based on the detection signal. In some embodiments, the system may include a timing measurement circuit, such as an analog-to-digital converter or a time-to-digital converter, for extracting timing information from the detection signal.

In some embodiments, the sensor controller may further be configured to determine an estimated location of the returned portion of the second portion of the light beam on the 2-D sensor array based on the determined actual location of the first portion of the light beam, and activate a second set of sensor elements of the 2-D sensor array based on the estimated location of the returned portion of the second portion of the light beam. In some embodiments, the estimated location of the returned portion of the second portion of the light beam on the 2-D sensor array may include a dimension and a pattern of the returned portion of the second portion of the light beam on the 2-D sensor array. In some embodiments, the sensor controller may be configured to determine the estimated location of the returned portion of the second portion of the light beam on the 2-D sensor array based on a relationship (e.g., a pre-determined or calibrated relationship) between the estimated location of the returned portion of the second portion of the light beam on the 2-D sensor array and the actual location of the first portion of the light beam on the 2-D sensor array.

In some embodiments, the sensor controller may further be configured to receive a detection signal from the second set of sensor elements and deactivate the second set of sensor elements after receiving the detection signal from the second set of sensor elements. In some embodiments, the system may include a measurement circuit for extracting timing information and/or light intensity information from the detection signal from the second set of sensor elements. In some embodiments, the system may include an analyzer for determining a characteristic of the target object based on the timing information and the light intensity information.

In some embodiments of the system, the sensor controller may be configured to dynamically select a location, dimension, and pattern of an area of the 2-D sensor array, and dynamically activate a set of sensor elements in the selected area of the 2-D sensor array and deactivate other sensor elements of the 2-D sensor array. In various embodiments, the selected area may include one of a circular area, a rectangular area, and an oval area of the 2-D sensor array.

In some embodiments, the 2-D sensor array may include a silicon photomultiplier (SiPM) sensor comprising a plurality of single-photon avalanche diode (SPAD) micro-cells. In some embodiments, the transmitter optical subsystem may include the beam splitting device.

In accordance with an example implementation, a method for measuring a reference beam and a corresponding returned beam from a target is disclosed. The method may include selectively activating, based on a laser beam scanning control signal, a first set of sensor elements of a 2-D sensor array, and receiving a detection signal from the first set of sensor elements. The first set of sensor elements corresponds to a location of the reference beam on the 2-D sensor array, and the reference beam includes a portion of a light beam controlled by the laser beam scanning control signal. The method may also include determining an actual location of the reference beam on the 2-D sensor array based on the detection signal from the first set of sensor elements, and determining an estimated location of the returned beam on the 2-D sensor array based on the actual location of the reference beam, where the returned beam includes a is returned by the target illuminated by the light beam. The method may further include selectively activating a second set of sensor elements on the 2-D sensor array based on the estimated location of the returned beam.

In some embodiments of the method, determining the estimated location of the returned beam on the 2-D sensor array may include determining the estimated location of the returned beam on the 2-D sensor array based on a pre-determined or calibrated relationship between the estimated location of the returned beam on the 2-D sensor array and the actual location of the reference beam on the 2-D sensor array.

In various embodiments of the method, the reference beam may be directed to the 2-D sensor array by a beam splitting device, and the returned beam may be directed to the 2-D sensor array by a receiver optical subsystem, where the actual location of the reference beam on the 2-D sensor array is spaced apart from the estimated location of the returned beam on the 2-D sensor array.

In some embodiments, the method for measuring the reference beam and the corresponding returned beam from the target may also include deactivating the first set of sensor elements after receiving the detection signal from the first set of sensor elements, and extracting timing information from the detection signal from the first set of sensor elements.

In some embodiments, the method for measuring the reference beam and the corresponding returned beam from the target may also include receiving a detection signal from the second set of sensor elements, deactivating the second set of sensor elements after receiving the detection signal from the second set of sensor elements, and extracting timing information from the detection signal from the second set of sensor elements. In some embodiments, extracting timing information from the detection signal from the second set of sensor elements may include extracting timing information from the detection signal from the second set of sensor elements using an analog-to-digital converter or a time-to-digital converter. In some embodiments, the method may further include determining a characteristic of the target based on the timing information extracted from the detection signal from the second set of sensor elements.

In accordance with another example implementation, an apparatus may be provided, which may include means for selectively activating a first set of sensor elements of a 2-D sensor array based on a laser beam scanning control signal, and means for receiving a detection signal from the first set of sensor elements. The first set of sensor elements corresponds to a location of a reference beam on the 2-D sensor array, and the reference beam may include a portion of a light beam controlled by the laser beam scanning control signal. The apparatus may also include means for determining an actual location of the reference beam on the 2-D sensor array based on the detection signal, and means for determining an estimated location of a returned beam on the 2-D sensor array from a target based on the actual location of the reference beam, where the returned beam corresponds to the reference beam and is returned by the target illuminated by the light beam. The apparatus may further include means for selectively activating a second set of sensor elements on the 2-D sensor array based on the estimated location of the returned beam.

In some embodiments, the apparatus may include means for directing the reference beam to the 2-D sensor array, and means for directing the returned beam to the 2-D sensor array on a location spaced apart from the actual location of the reference beam on the 2-D sensor array. In some embodiments, the apparatus may include means for deactivating the first set of sensor elements after receiving the detection signal from the first set of sensor elements, and means for extracting timing information from the detection signal from the first set of sensor elements. In some embodiments, the apparatus may include means for receiving a detection signal from the second set of sensor elements, means for deactivating the second set of sensor elements after receiving the detection signal from the second set of sensor elements, and means for extracting timing information from the detection signal from the second set of sensor elements. In some embodiments, the apparatus may further include means for determining a characteristic of the target based on the timing information extracted from the detection signal from the second set of sensor elements.

In accordance with yet another example implementation, a non-transitory computer-readable storage medium including machine-readable instructions stored thereon is disclosed. The non-transitory computer-readable storage medium may include instructions that, when executable by one or more processors, cause the one or more processors to selectively activate a first set of sensor elements of a 2-D sensor array based on a laser beam scanning control signal, and receive a detection signal from the first set of sensor elements, where the first set of sensor elements corresponds to a location of a reference beam on the 2-D sensor array, and the reference beam includes a portion of a light beam controlled by the laser beam scanning control signal. The instructions may also cause the one or more processors to determine an actual location of the reference beam on the 2-D sensor array based on the detection signal, determine an estimated location of a returned beam on the 2-D sensor array from a target based on the actual location of the reference beam, where the returned beam corresponds to the reference beam is returned by the target illuminated by the light beam, and selectively activate a second set of sensor elements on the 2-D sensor array based on the estimated location of the returned beam.

In various embodiments of the non-transitory computer-readable storage medium, the instructions may also cause the one or more processors to receive a detection signal from the second set of sensor elements, deactivate the second set of sensor elements after receiving the detection signal from the second set of sensor elements, and extract timing information and light intensity information from the detection signal from the second set of sensor elements. In some embodiments, the instructions may also cause the one or more processors to determine a characteristic of the target based on the timing information and the light intensity information extracted from the detection signal from the second set of sensor elements.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

DETAILED DESCRIPTION

Figure 1:
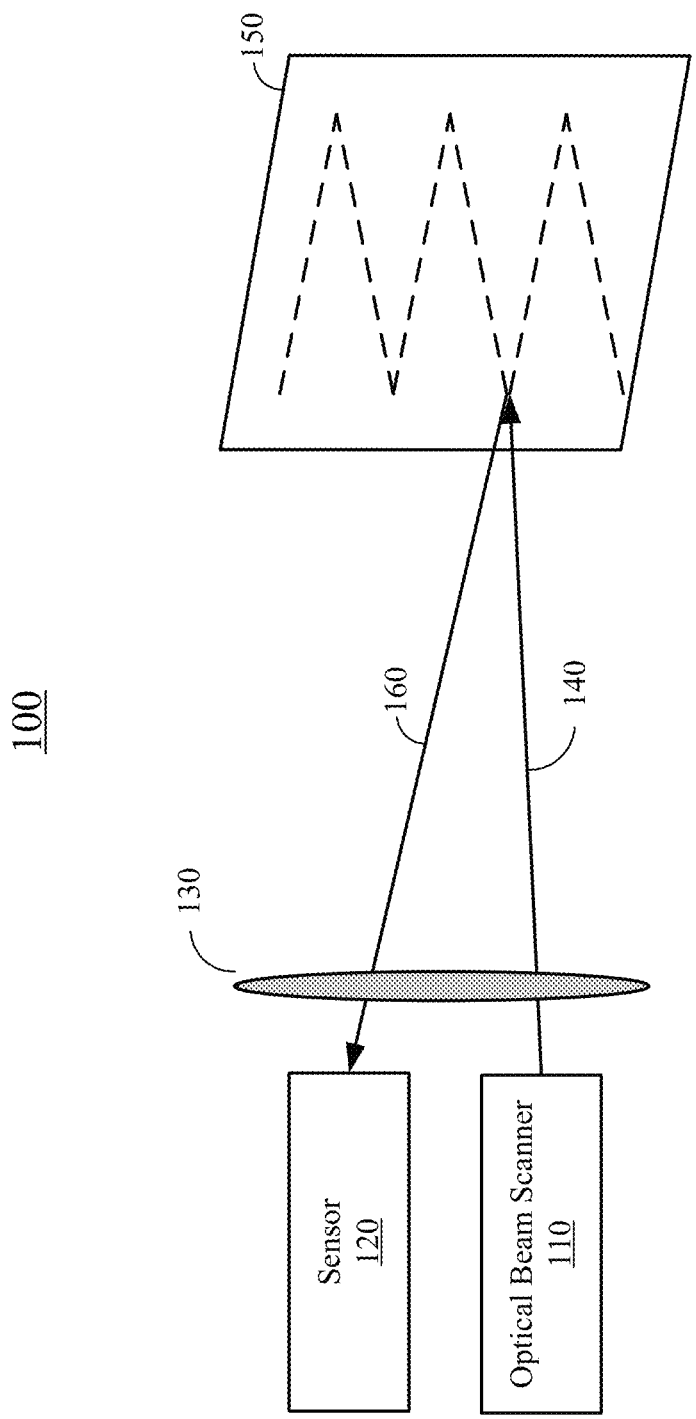
FIG. 1 is a simplified block diagram of an example system.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Techniques disclosed herein relate to measuring a returned beam from a target object in a light detection and ranging (LIDAR) system using a two-dimensional (2-D) sensor array, such as a silicon photomultiplier (SiPM) sensor including a 2-D array of single-photon avalanche diode (SPAD) micro-cells. More specifically, in a LIDAR system according to some aspects of this disclosure, an optical subsystem of the LIDAR system may be configured to partially split a fraction of a scanning laser beam from a laser source as a reference beam and direct the reference beam onto the surface of the 2-D sensor array in a dynamically changing area that is spaced apart from the area of the light spot of the corresponding returned beam from the target object. By measuring the location of the light spot of the reference beam, the expected location and pattern of the light spot of the returned beam can be estimated, and the corresponding sensor elements (e.g., SPAD micro-cells) can be dynamically selected and grouped into a "virtual," variable pixel for measuring the returned beam based on the estimated location and pattern of the light spot of the returned beam when the returned beam traverses the surface of a 2-D sensor array of a LIDAR system in response to the scanning of the laser beam according to a scanning pattern.

In this way, the location, timing and intensity information of the reference beam and the returned beam can be measured by a single sensor array. No additional sensors, detectors, data converters, or other extra components are needed to determine the location of the reference beam or the returned beam. Therefore, the assembly and calibration of the LIDAR system can be much easier and the accuracy and reliability of the LIDAR system can be improved. In addition, because only a dynamically selected set of sensor elements corresponding to the reference beam or a selected set of sensor elements corresponding to the estimated location and pattern of the returned beam may be activated during a time period, the interference between the reference beam and the returned beam and the noise caused by, for example, background radiations or stray (scattered) light beams on other sensor elements of the sensor array can be reduced or minimized.

A LIDAR system, also referred to as a laser detection and ranging (LADAR) system, is an active remote sensing system that can be used to obtain the range from a source to one or more points on a target. A LIDAR uses a light beam, typically a laser beam, to illuminate the one or more points on the target. Compared with other light sources, a laser beam may propagate over long distances without spreading significantly (highly collimated), and can be focused to small spots so as to deliver very high optical power densities and provide fine resolution. The laser beam may be modulated such that the transmitted laser beam includes a series of pulses. The transmitted laser beam may be directed to a point on the target, which may reflect the transmitted laser beam. The laser beam reflected from the point on the target can be measured, and the time-of-flight (ToF) from the time a pulse of the transmitted light beam is transmitted from the source to the time the pulse arrives at a detector near the source or at a known location may be measured. The range from the source to the point on the target may then be determined by, for example, r=c×t/2, where r is the range from the source to the point on the target, c is the speed of light in free space, and t is the ToF of the pulse of the light beam from the source to the detector.

FIG. 1 is a simplified block diagram of an example system 100, such as a LIDAR, LADAR, or other like system. System 100 may include an optical beam scanner 110, a sensor 120, and an optical subsystem 130. Optical beam scanner 110 may include an optical source, such as a laser, a laser diode, a vertical cavity surface-emitting laser (VCSEL), a light-emitting diode (LED), or other optical source. The laser may be, for example, an infrared pulsed fiber laser or other mode-locked laser with an output wavelength of, for example, 930-960 nm, 1030-1070 nm, around 1550 nm, or longer. Optical beam scanner 110 may also include a light directing device, such as a scanning stage, a piezoelectric actuator, or a microelectromechanical (MEMS) device that can change the direction of the transmitted laser beam from the laser. Optical subsystem 130 may be used to collimate the transmitted laser beam from optical beam scanner 110 such that collimated laser beam 140 may propagate over a long distance to a target without spreading significantly. Optical subsystem 130 may also focus the transmitted laser beam from optical beam scanner 110 onto a small spot on the target. Optical subsystem 130 may also be used to expand the laser beam or divert the laser beam. As a result of the small beam spot on the target object, the resolution of system 100 may be improved.

Optical subsystem 130 may also be used to focus a returned laser beam 160 from a target 150 onto sensor 120 directly or into optical fibers connected to sensor 120. Sensor 120 may be a detector having a working (sensitive) wavelength comparable with the wavelength of the optical source. The detector may be a high-speed photodetector, for example, a photodiode with an intrinsic semiconductor region between a p-type semiconductor and an n-type semiconductor region (PIN photodiode), or an InGaAs avalanche photodetector (APD). Sensor 120 may also include a onedimensional (1-D) or 2-D detector array, such as a SiPM sensor including a plurality of SPAD micro-cells.

To measure ranges to multiple points on a target or in a field-of-view (FOV) of a system, a laser beam is usually scanned in one or two dimensions as shown in FIG. 1. In order to achieve a 1-D or 2-D scan pattern, a system may use, for example, an array of lasers, multiple sets of lasers/sensors that are slightly tilted against each other, or a 2-D scanning mechanism, such that the laser beam may be scanned in, for example, a horizontal raster pattern, and/or a vertical raster pattern as shown in FIG. 1.

There are many different types of laser beam scanning mechanisms, for example, a multi-dimensional mechanical stage, a Galvo-controlled mirror, a MEMS mirror driven by micro-motors, a piezoelectric translator/transducer using piezoelectric material such as a quartz or lead zirconate titanate (PZT) ceramic, an electromagnetic actuator, or an acoustic actuator. Laser beam scanning may also be achieved without mechanical movement of any component, for example, using a phased array technique where phases of lasers in a 1-D or 2-D laser array may be changed to alter the wave front of the superimposed laser beam. Many of the above-described beam scanning mechanisms may be bulky and expensive. In some LIDAR systems, alternatively or additionally, a resonant fiber scanning technique may be used to scan a laser beam. Due to the flexibility of the optical fiber, a wide field of view and a high resolution may be achieved. In addition, a resonant fiber beam scanner may be small and less expensive.

In many of these scanning mechanisms, the position of the scanning beam may be determined based on the control signals that drive the scanning mechanisms, such that the system can determine the point on the target that reflects a particular transmitted light beam at a given time. For example, in FIG. 1, the position of the transmitted beam on optical subsystem 130 and thus the position of the transmitted beam on target 150 may be determined based on the signal that controls optical beam scanner 110 in system 100. As a more specific example, in a system with a MEMS mirror driven by micro-motors, the orientation of a MEMS micro-mirror may be determined based on the signal that controls the micro-motor that rotates the micro-mirror. The direction of the reflected beam by the micro-mirror and thus the position of the beam on the beam-shaping device at a given time can then be determined based on the orientation of the micro-mirror at the given time.

A 2-D scan pattern can be produced with a single 2-axis actuator using a single resonant optical fiber. For example, if the horizontal axis produces a constant amplitude sine wave, and the vertical axis produces a cosine wave with the same frequency and amplitude as the sine wave, a circle may result from a symmetric fiber. The scanning amplitudes on both x and y axes can be progressively decreased and/or increased to produce a spiral scan pattern by progressively decreased and/or increased control signals. As a more specific example, if the horizontal vibration is a triangle amplitude modulated sine wave and the vertical vibration is a triangle amplitude modulated cosine wave, an evenly spaced spiral scan pattern may be generated.

In many systems, the actual scan pattern may not follow an ideal scan pattern as designed. For example, in a LIDAR system using a resonating fiber cantilever, due to the dynamics of the resonating fiber cantilever, the scan pattern may be distorted from the ideal pattern. Thus, in various systems, it is desirable to determine the position of the LIDAR beam at the transmitter of the systems, and thus the corresponding position of the LIDAR beam on the target and the corresponding position of the returned beam from the target on the receiver of the systems.

Figure 2:
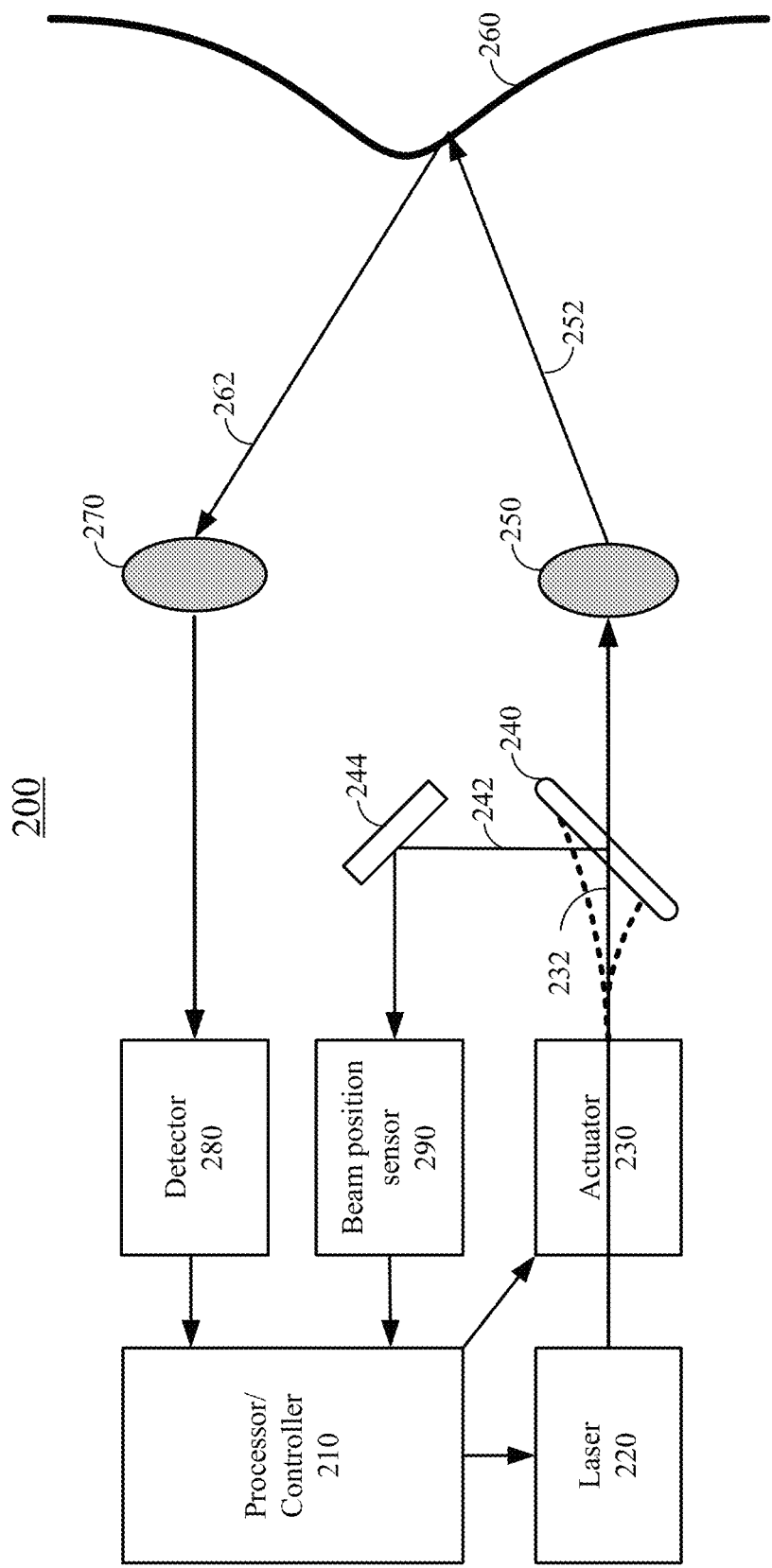
FIG. 2 illustrates an example system with a beam splitter for determining the position of a light beam at a transmitter.

FIG. 2 illustrates an example system 200 with a beam splitter for determining the position of a light beam at a transmitter. System 200 may be a LIDAR, LADAR, or other like system. As in system 100 of FIG. 1, system 200 may include a laser 220, an optical fiber 232 coupled to laser 220 for guiding the output beam from laser 220, and an actuator 230 for stimulating optical fiber 232 to scan the output laser beam from laser 220. System 200 also includes a transmitter lens 250 for directing an incident laser beam towards a target 260 as shown by laser beam 252. Reflected laser beam 262 from target 260 may be collected by a receiver lens 270 and directed to a detector 280 as described above with respect to sensor 120 of FIG. 1. A processor/controller 210 may be used to synchronize and control the operations of laser 220, actuator 230, and detector 280, and analyze various points on target 260 based on the control signals for laser 220 and actuator 230, and the reflected signals detected by detector 280.

To detect the position of the laser beam on transmitter lens 250 and thus the position of the laser beam on target 260, a beam splitter 240 and a beam position sensor 290 may be added to system 200. Beam splitter 240 may split the output laser beam from optical fiber 232 and direct a portion of the output laser beam from optical fiber 232 towards beam position sensor 290 as shown by laser beam 242 in FIG. 2. Laser beam 242 may be directed to beam position sensor 290 by beam splitter 240 directly or indirectly through a mirror 244. Beam position sensor 290 may be a 2-D position-sensing detector (PSD) that can detect laser beam 242. Processor/controller 210 or beam position sensor 290 may determine the position of the output laser beam from optical fiber 232 on beam splitter 240 or transmitter lens 250 based on the position (pixels) of the portion of beam position sensor 290 that detects laser beam 242.

As can be seen from FIG. 2, this method possibly suffers from high complexity, high cost, and high calibration requirements. For example, since a separate beam position sensor 290 is added in addition to detector 280, the relative physical location and orientation of beam position sensor 290 and detector 280, as well as the relative timing between beam position sensor 290 and detector 280, may need to be adjusted or calibrated at or after the assembly. In some cases, the calibration may need to be performed periodically due to changes in relative position and shifts in time caused by the change of optical path or electronic characteristics of beam position sensor 290 and detector 280. Due to calibration error or changes in relative physical location or timing relationship between beam position sensor 290 and detector 280, accuracy achieved by this method may be compromised for certain applications requiring high precision LIDAR beam position determination.

Furthermore, in a LIDAR system where the receiver includes an optical subsystem with a wide FOV, which collects the light from the scanned area onto a single APD, such as some embodiments according to FIGS. 1 and 2, background radiation from the sun or other interferers (e.g., a car's high beam light etc.) may be collected onto the APD from the FOV of the optical subsystem. This may adversely affect the operational range, accuracy, and sensitivity of the LIDAR system. A 2-D sensor array may be used on the receiver such that the FOV of each individual sensor element is only a fraction of the combined FOV of the whole system and, as a result, the signal-to-noise ratio of the system may be improved.

Figure 3:
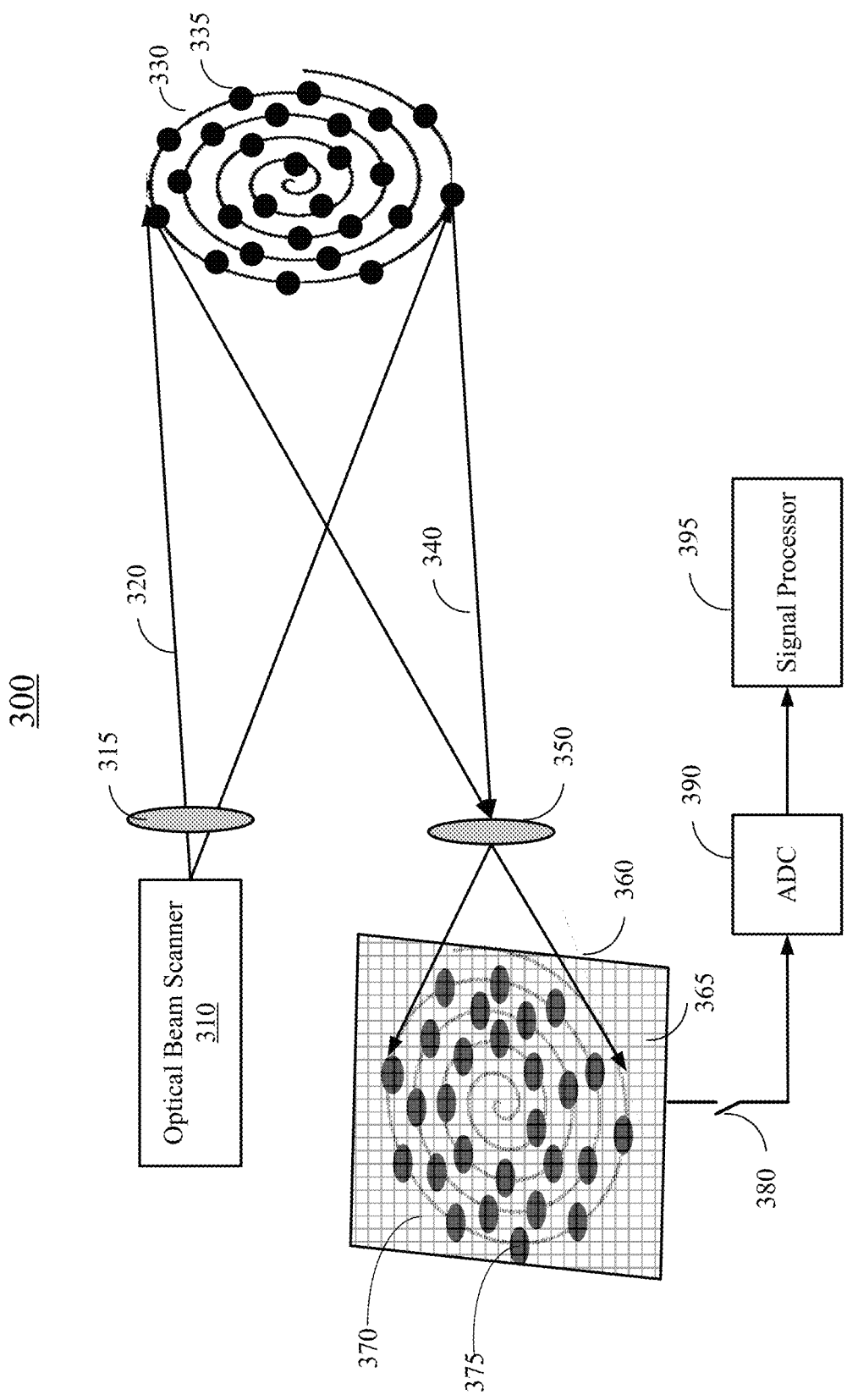
FIG. 3 illustrates a simplified block diagram of an example LIDAR system using a two-dimensional sensor array.

FIG. 3 illustrates a simplified block diagram of an example LIDAR system 300 using a two-dimensional sensor array, such as a 2-D APD array or a SiPM sensor including a 2-dimensional array of SPAD micro-cells. As shown in FIG. 3, in LIDAR system 300, an optical beam scanner 310 may project a light beam 320, via a transmitter optical subsystem 315 into the environment using, for example, a resonant fiber optic cantilever, to form, for example, a spiral scanning pattern 330, as described above. Each dot 335 in spiral scanning pattern 330 corresponds to a light spot of light beam 320 on a target in the environment.

On the receiving path, a receiver optical subsystem 350 may collect a returned beam reflected by the target and background radiations from various sources into a focal plane of receiver optical subsystem 350. A 2-D sensor array 360 may be positioned on the focal plane of receiver optical subsystem 350 to detect the returned beam. 2-D sensor array 360 may include a plurality of sensor elements 365. The image of the projected scanning pattern 370 is illustrated in FIG. 3, where each oval pattern 375 represents the light spot of the returned beam on 2-D sensor array 360 on the focal plane of receiver optical subsystem 350. As shown in FIG. 3, the light spot of the returned beam on 2-D sensor array 360 may be only located on one or a few sensor elements 365.

A controller (not shown in FIG. 3) may selectively connect the detection signal from one or more sensor elements 365 through a switch or multiplexer 380 to an analog-to-digital converter (ADC) 390 for data conversion. The converted detection signals may then be processed by a signal processor 395 to determine the intensity, phase, or time of flight of the returned beam.

As a result, the FOV of each individual sensor element is only a fraction of the combined FOV of the whole system, and consequently, the amount of noise radiation collected into each sensor element is reduced, while the returned beam is not attenuated. Therefore, the overall signal-to-noise ratio (SNR) of the system may be improved, thus increasing the measurement range and improving the accuracy and sensitivity of the measurements, and making the system more robust in the presence of interferences.

As shown in FIG. 3, in a LIDAR system, the light spot of the returned beam from the target may not be centered in the middle of a sensor element. The light spot of the returned beam may be of a circular shape, an oval shape, or an irregular shape that differs from the shape of a sensor element (e.g., with a shape of a square). In addition, as described above with respect to FIG. 2, the scan pattern may be distorted from the ideal pattern, and thus the location of the returned beam on the 2-D sensor array may not be known to the controller that selects the detection signals from the one or more sensor elements. A beam position sensor, such as beam position sensor 290 of FIG. 2, may be needed to determine the location of the transmitted light beam on transmitter optical subsystem 315 and thus the estimated location of the returned beam, such that the controller may select the detection signals from the corresponding sensor elements or selectively activate the corresponding sensor elements. However, as described above, adding the extra beam position sensor may increase the complexity and cost of the LIDAR system and may require more complicated calibration and/or more frequent re-calibration.

Figure 4:
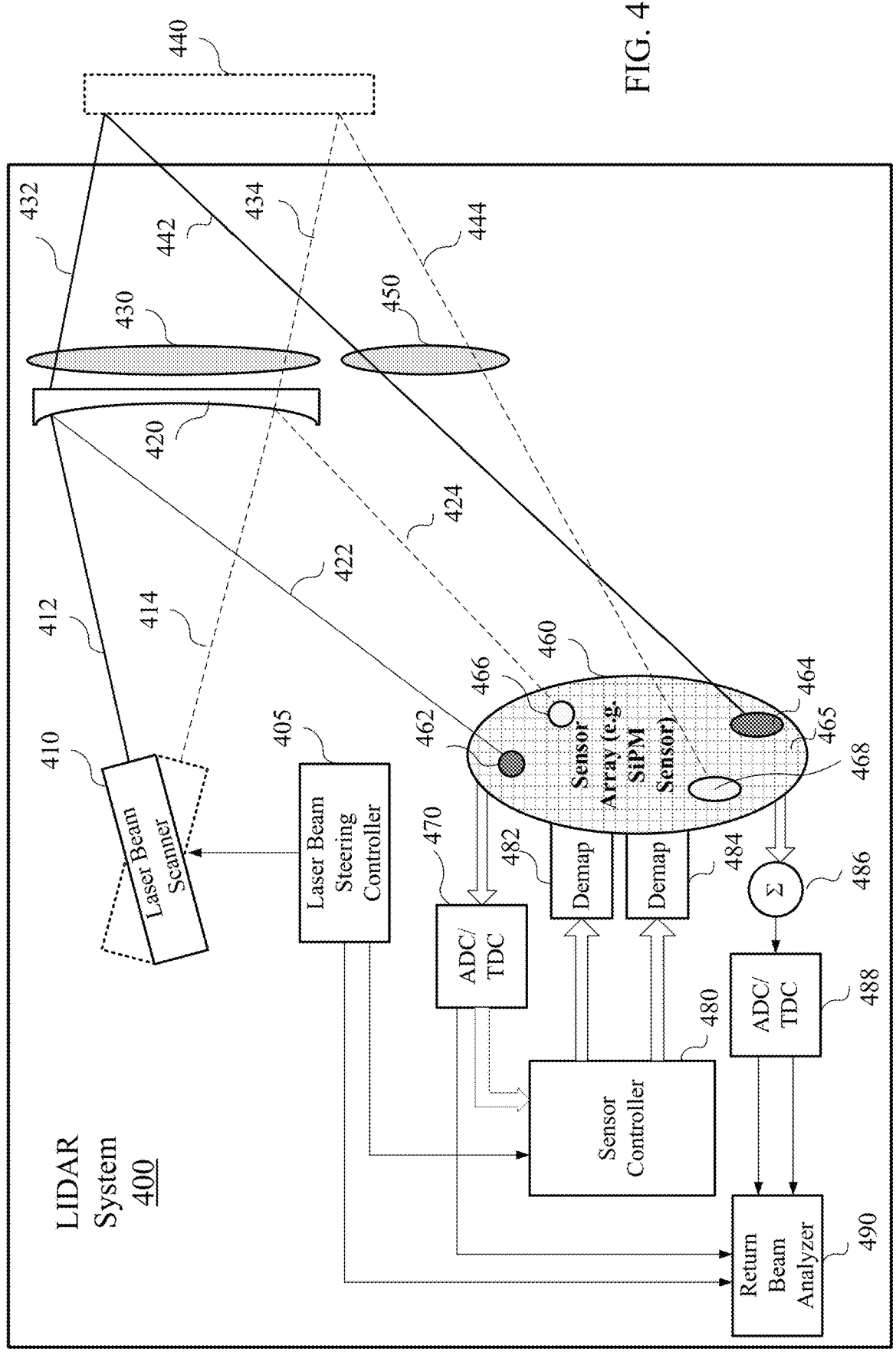
FIG. 4 illustrates a simplified block diagram of an example LIDAR system, according to some aspects of this disclosure.

FIG. 4 illustrates a simplified block diagram of an example LIDAR system 400, according to some aspects of this disclosure. In FIG. 4, LIDAR system 400 uses a single 2-D sensor array 460 including a plurality of sensor elements 465. In some systems, 2-D sensor array 460 may include a SiPM sensor comprising 2-D array of SPAD micro-cells. SiPM sensors and SPAD micro-cells may replace photomultiplier tubes (PMTs), APDs and PIN photodiodes in many optical systems such as a LIDAR system, due to high, single-photon sensitivity, lower cost, improved performance, enhanced system reliability, and lower design complexity. A SiPM sensor may include a plurality of SPAD micro-cells arranged in a 2-D array. The SPAD micro-cells may be grouped into a plurality of pixels, each pixel including one or more SPAD micro-cells arranged in an area of a desired shape with a desired dimension, such as a circle, an oval, a rectangle, or a square, in order to selectively read out the intensity of light cast on a part of the sensor surface that includes one or more pixels, while excluding ambient light detected by other pixels, which may contribute to signal interference or noise and reduce the SNR of the system.

As shown in FIG. 4, LIDAR system 400 may include a laser beam steering controller 405 that controls the transmission of a pulsed laser beam from a laser beam scanner 410 and the scanning of the transmitted pulsed laser beam to generate a desired scanning pattern, such as a 2-D scanning pattern (e.g., a spiral). A small fraction of a transmitted pulsed laser beam 412 from laser beam scanner 410 may be split by a transmitter optical subsystem 430 (or a separate beam splitting device 420) as a reference beam 422 and directed onto an area 462 on the surface of 2-D sensor array 460, while the rest (432) of the transmitted pulsed laser beam 412 may propagate through transmitter optical subsystem 430 and illuminate a target object 440 when the transmitted pulsed laser beam is scanned in a desired scanning pattern. The returned beam 442 reflected or scattered by target object 440 may be collected by a receiver optical subsystem 450 and directed onto the surface of the same 2-D sensor array 460 in an area spaced apart from area 462 corresponding to the reference beam 422, such as, for example, in an area 464 opposite to area 462 where the light spot of the reference beam is located, to minimize the interference between the reference beam 422 and the returned beam 442.

To measure the distance of target object 440 from LIDAR system 400 using the ToF of the pulsed laser beam (including 412, 432, and 442), the time when the returned beam 442 is detected by 2-D sensor array 460 and the time when the pulsed laser beam was transmitted into the environment (or the time when the reference beam is detected by 2-D sensor array 460 because the distance between laser beam scanner 410 and transmitter optical subsystem 430 is short) may be measured by various methods using various timing measurement circuits.

In some implementations, the timing measurements may be performed using one or more time-to-digital converters (TDCs). In a LIDAR system using a TDC, a set of predefined threshold values may be used to trigger the start and/or stop of one or more time counters, such that, when the detection signal from a sensor elements or a group of sensor elements exceeds certain values, specific counters may be activated. The TDC may be relatively simple in system architecture and may be relatively easy to implement. However, the use of a TDC may result in the loss of the information about the returned beam or the reference beam. For example, information other than the timing information of the returned beam, such as the intensity of the returned beam, may be useful for determining the characteristics of the target object. A TDC may not be sufficiently accurate for measuring the intensity of the returned beam. In addition, in cases where multiple objects may be present in the light path, for example, branches of a tree, water droplets from rain, etc., a TDC may not be able to extract other useful information available in the detection signals from the sensor elements.

In some implementations, the timing measurements may be performed with one or more ADCs. An ADC may provide a better way to extract information from the detection signals from the sensor elements. However, in some examples, an ADC used in a LIDAR system may need to have fairly high performance, for example, at a speed of about a few giga-samples per second (GSPS). Examples of GSPS ADCs may include an ADC using interleaved architecture. In some systems, an ADC with a lower resolution, such as an 8-bit flash ADC, may be used.

As shown in FIG. 4, based on, for example, a laser beam scanning control signal from laser beam steering controller 405, a sensor controller 480 may estimate the location of the light spot of a reference beam on 2-D sensor array 460 (e.g., a SiPM sensor), such as area 462 for reference beam 422. Sensor controller 480 may then select SPAD micro-cells in an area including area 462, and activate these SPAD micro-cells through a de-mapping circuit 482. The detection signals from these SPAD micro-cells may be provided to a first ADC/TDC 470 for detecting reference beam 422. The outputs from first ADC/TDC 470 may indicate the locations of the SPAD micro-cells that generate a signal larger than a threshold value, and the time when the signal is detected. Based on the outputs from first ADC/TDC 470, sensor controller 480 may determine the actual location and/or pattern of the light spot of reference beam 422. Note that detailed intensity information of the reference beam may not be needed.

After the actual location and/or pattern of the light spot of reference beam 422 are determined, the activated SPAD micro-cells may be deactivated. Sensor controller 480 may then determine the estimated location and pattern of the light spot of returned beam 442 based on the actual location and/or pattern of the light spot of reference beam 422 and, for example, a pre-measured or calibrated relationship between the location of the light spot of the reference beam and the location of the light spot of the corresponding returned beam. Sensor controller 480 may then select a group of SPAD micro-cells based on the estimated location and pattern of the light spot of returned beam 442 to form a pixel, and activate the selected SPAD micro-cells though another de-mapping circuit 484. The detection signals from the SPAD micro-cells activated by de-mapping circuit 484 may then be added together by a summing circuit 486 and sent to a second ADC/TDC 488. Second ADC/TDC 488 may pre-process the detection signals, and determine the time when a signal larger than a threshold is detected and the intensity of the detected returned beam. In some implementations, de-mapping circuit 484 and de-mapping circuit 482 may be a same circuit. In some implementations, first ADC/TDC 470 and second ADC/TDC 488 may be a same ADC/TDC circuit, and a multiplexing circuit may be used to select the input to the ADC/TDC circuit, because, at a given time, only one set of sensor elements (e.g., SPAD micro-cells for the reference beam or SPAD micro-cells for the returned beam) may be activated.

The time when the pulsed laser beam is transmitted or the time when the reference beam is detected (e.g., determined by first ADC/TDC 470), the time when the returned beam is detected (e.g., determined by the second ADC/TDC 488), and the intensity of the detected returned beam may be analyzed by return beam analyzer 490 to determine the distance and other characteristics of the target object, such as the reflectivity and/or the material of the target object.

As the pulsed laser beam scans according to a designed scan pattern, the locations of the light spots of the reference beam and the corresponding returned beam on 2-D sensor array 460 may change. For example, a transmitted light beam 414 may be partially reflected by transmitter optical subsystem 430 (or separate beam splitting device 420) as a reference beam 424 onto an area 466 on the surface of 2-D sensor array 460, while the rest (434) of the transmitted light beam 414 may propagate through transmitter optical subsystem 430 and illuminate target object 440. The returned beam 444 reflected or otherwise returned by target object 440 may be collected by receiver optical subsystem 450 and directed onto the surface of 2-D sensor array 460 in an area spaced apart from area 466 corresponding to reference beam 424, such as, for example, in an area 468 opposite to area 466 where the light spot of reference beam 424 is located. SPAD micro-cells in area 466 or 468 may be selectively grouped into a pixel and activated, as described above with respect to reference beam 422 and returned beam 442.

It is noted that even though specific examples using a SiPM sensor including 2-D SPAD microcells are described above or elsewhere in this disclosure, these examples are for illustration purposes only and are not meant to limit this disclosure to these specific examples. In various implementations, other sensor arrays, such as a 2-D APD sensor array, may be used.

Figure 5:
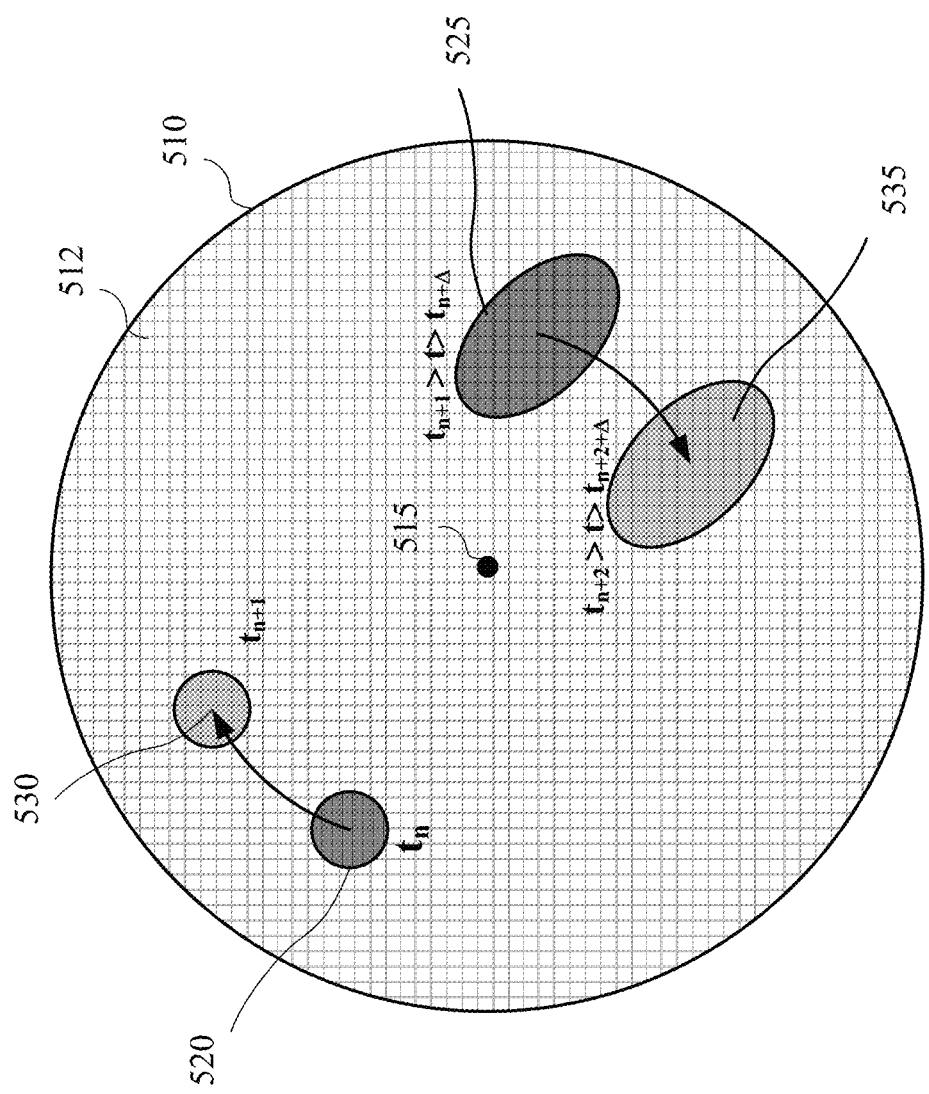
FIG. 5 illustrates example reference beams and the corresponding returned beams on a sensor array during a light beam scanning.
Figure 6:
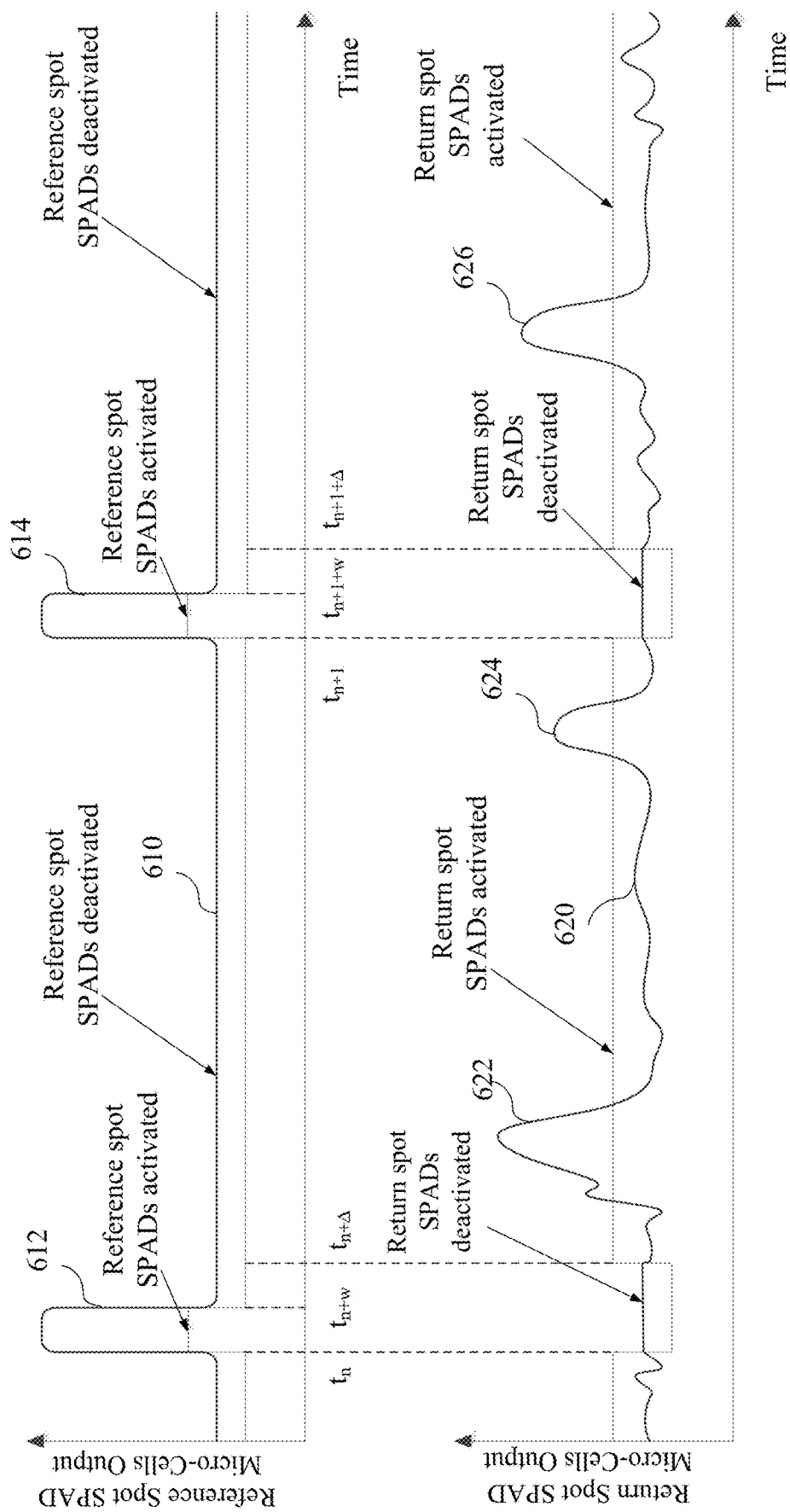
FIG. 6 illustrates example waveforms of output signals of selectively activated sensor elements on a sensor array for detecting the reference beam and the returned beam.

FIG. 5 illustrates example reference beams and the corresponding returned beams on a sensor array during a light beam scanning. FIG. 6 illustrates example waveforms of output signals from selectively activated sensor elements on a sensor array for detecting reference beams and returned beams, such as the example reference beams and returned beams shown in FIG. 5.

As shown in FIGS. 5 and 6, at or before time $t_n$, a set of reference spot SPAD micro-cells in an estimated area of a 2-D sensor array (e.g., a SiPM sensor 510 with a 2-D array of SPAD micro-cells 512) where the light spot of a reference beam n may be located at time $t_n$ (e.g., an area including area 520) may be grouped as a pixel and selectively activated. The area may be determined based on a laser beam steering signal. When these reference spot SPAD micro-cells are activated, the rest of the SPAD micro-cells of SiPM sensor 510 may be deactivated to reduce the interference between the returned beam and the reference beam.

Due to the phase and amplitude distortions of the steering signal and the non-ideal response of the scanning mechanism to the steering signal, the actual location of reference beam n on the surface of SiPM sensor 510 may deviate from the expected area based on the applied steering signal. Thus, the activated reference spot SPAD micro-cells may cover an area including but greater than the estimated area determined based on the laser beam steering signal.

At time $t_n$, the light spot of reference beam n may be located at area 520 on SiPM sensor 510. Reference beam n may be detected by the activated reference spot SPAD micro-cells as indicated by a pulse 612 in a waveform 610 of the output signal from reference spot SPAD micro-cells. The activated reference spot SPAD micro-cells may be deactivated at time $t_{n+w}$ or after the reference beam is no longer detected by the activated reference spot SPAD micro-cells. Based on the output of the reference spot SPAD micro-cells, the actual location and/or pattern of the light spot of reference beam n and the estimated location and/or pattern of the corresponding returned beam n may be determined as described above with respect to FIG. 4.

After a time delay, at time $t_{n+\Delta}$, a set of return spot SPAD micro-cells (e.g., SPAD micro-cells in an area including area 525) may be selected to form a pixel and be activated, based on the estimated location and/or pattern of returned beam n and a pre-measured or calibrated relationship between the locations of the reference beam and the returned beam. The transmitter optical subsystem and the receive optical subsystem of a LIDAR system, such as LIDAR system 400, may be configured such that area 520 and area 525 are spaced apart, for example, located at opposite sides of SiPM sensor 510 with respect to a center 515 of SiPM sensor 510 as shown in FIG. 5. Thus, the interference between the reference beam and the returned beam can be minimized or eliminated because the reference spot SPAD micro-cells and the return spot SPAD micro-cells are not overlapping, and/or are activated at different times even if the reference spot and the return spot are close to each other.

Between time $t_{n+\Delta}$ and time $t_{n+1}$, returned beam n may be detected by the activated return spot SPAD micro-cells as shown by a waveform 620 of the output from the activated return spot SPAD micro-cells. As shown in FIG. 6, between time $t_{n+\Delta}$ and time $t_{n+1}$, two pulses 622 and 624 above a threshold value may be detected. Pulses 622 and 624 may have different shapes, durations, phases, or amplitudes, and may be caused by, for example, multiple objects in the light path, such as branches of a tree, or a scanning light beam located at the boundaries between two or more objects. Based on the timing information, shapes, durations, phases, or amplitudes of pulses 622 and 624, along with, for example, timing information of pulse 612, the distance and/or other characteristics of the target object that causes returned beam n may be determined. After time $t_{n+1}$, the activated return spot SPAD micro-cells may be deactivated.

Similarly, at or before time $t_{n+1}$, a different set of reference spot SPAD micro-cells in an estimated area of SiPM sensor 510 where the light spot of a reference beam n+1 may be located at time $t_{n+1}$ (e.g., an area including area 530) may be grouped as a pixel and selectively activated. When these reference spot SPAD micro-cells are activated, the rest of the SPAD micro-cells of SiPM sensor 510 may be deactivated to reduce the interference between returned beam and the reference beam.

At time $t_{n+1}$, the light spot of reference beam n+1 may move clockwise from area 520 to area 530 on SiPM sensor 510. Reference beam n+1 may be detected by the activated reference spot SPAD micro-cells as indicated by a pulse 614 in waveform 610. The activated reference spot SPAD micro-cells may be deactivated at time $t_{n+1+w}$ or after the reference beam is no longer detected by the activated reference spot SPAD micro-cells. Based on the output of the reference spot SPAD micro-cells, the actual location and/or pattern of the light spot of reference beam n+1 and the estimated location and/or pattern of the corresponding return light beam n+1 may be determined as described above with respect to FIG. 4.

After a time delay, at time $t_{n+1+\Delta}$, a different set of return spot SPAD micro-cells (e.g., SPAD micro-cells in an area including area 535 moved clockwise from area 525) may be selected to form a pixel based on the estimated location and/or pattern of return light beam n+1 and be activated. The transmitter optical subsystem and the receive optical subsystem of the LIDAR system may be configured such that area 530 and area 535 are spaced apart, for example, located at opposite sides of SiPM sensor 510 with respect to a center 515 of SiPM sensor 510 as shown in FIG. 5. In this way, the interference between the reference beam and the returned beam can be minimized.

Between time $t_{n+1+\Delta}$ and time $t_{n+2}$, returned beam n+1 may be detected by the activated return spot SPAD micro-cells as shown by waveform 620. As shown in FIG. 6, between time $t_{n+1+\Delta}$ and time $t_{n+2}$, a pulse 626 above a threshold value may be detected. After time $t_{n+2}$, the activated return spot SPAD micro-cells may be deactivated. Based on the timing information, shape, duration, phase, or amplitude of pulse 626, along with, for example, timing information of pulse 614, the distance and/or other characteristics of the target object that causes returned beam n+1 may be determined.

As shown in FIG. 5, because, compared with the returned beam, the reference beam may travel a shorter distance (thus less divergence) and is not reflected by the target objects (thus less scattering), the light spot of the reference beam may be smaller than the light spot of the reflected light beam and may have a more predictable pattern than the reflected beam. Pixels with different numbers and patterns of SPAD micro-cells may be selected and activated accordingly based on the estimated location and pattern of the corresponding light spot.

In various implementations, each pixel of the SiPM sensor may include multiple SPAD micro-cells arranged in an area of a desired shape, such as a circle, an oval, a rectangle, or a square. For example, in one example, each pixel of the SiPM sensor may include 20×20 SPAD micro-cells arranged in a square. In some implementations, the location, size, and shape of a pixel can be dynamically determined and the corresponding SPAD micro-cells may be dynamically selected. In other words, the size or shape of one pixel selected at a first time period may be different from the size or shape of another pixel selected at a different time period.

Because the sensor elements of the 2-D sensor array (e.g., SPAD micro-cells in a SiPM sensor) that may be illuminated by the reference beam or the returned beam at a given time instant may be estimated, other sensor elements that may not be illuminated by the reference beam or the returned beam at the given time can be deactivated as they may not provide useful information. In this way, the power consumption of the SiPM may be reduced, and the amount of data processing may also be reduced, because only a fraction of the SPAD micro-cells is activated and the corresponding output signals are processed.

Several other advantages may be achieved by a LIDAR system according to certain aspects of this disclosure. For example, the SNR of the detection signal for the returned beam may be improved because most background radiation and other noise that would otherwise be collected and detected by the deactivated SPAD micro-cells may be excluded by deactivating these SPAD micro-cells, thus reducing the total noise, while the intensity of the desired returned beam from the target object may not be affected. Due to the improved SNR performance, a longer range and/or better signal accuracy/sensitivity may be achieved using such a LIDAR system.

Furthermore, the complexity of the LIDAR system may be reduced. For example, only one 2-D sensor array may be used, and thus the assembly, alignment, and calibration of the system may be easier. In addition, in some implementations, only one ADC/TDC may be needed because, at a given time, only one set of sensor elements (e.g., reference spot SPAD micro-cells or return spot SPAD micro-cells) may be activated.

In some embodiments, the 2-D sensor array may also be used for performing calibration/re-calibration of the transmission path and/or the receiving path, including, for example, laser beam scanner 410, transmitter optical subsystem 430 and/or separate beam splitting device 420 if used, receiver optical subsystem 450, and the 2-D sensor array itself. When the calibration of the system becomes off over time, the actual direction of the laser beam may be different from the one that is expected. To re-calibrate the system, laser beam steering controller 405 may control laser beam scanner 410 to transmit a pulsed laser beam in a particular direction. By scanning all or an estimated portion of the sensor elements in 2-D sensor array 460, the sensor elements that actually detect the reference beam or the returned beam may be determined. The relationship among the laser beam steering signal, the corresponding scanning direction, the location and/or the pattern of the light spot of the corresponding reference beam, and the location and/or the pattern of the light spot of the corresponding returned beam may be determined. Calibrations for a series of scanning directions may be performed, and techniques such as various interpolation or extrapolation techniques may be used to determine the relationship among other scanning directions and the corresponding reference beams and returned beams that have not been measured during the calibration.

Figure 7:
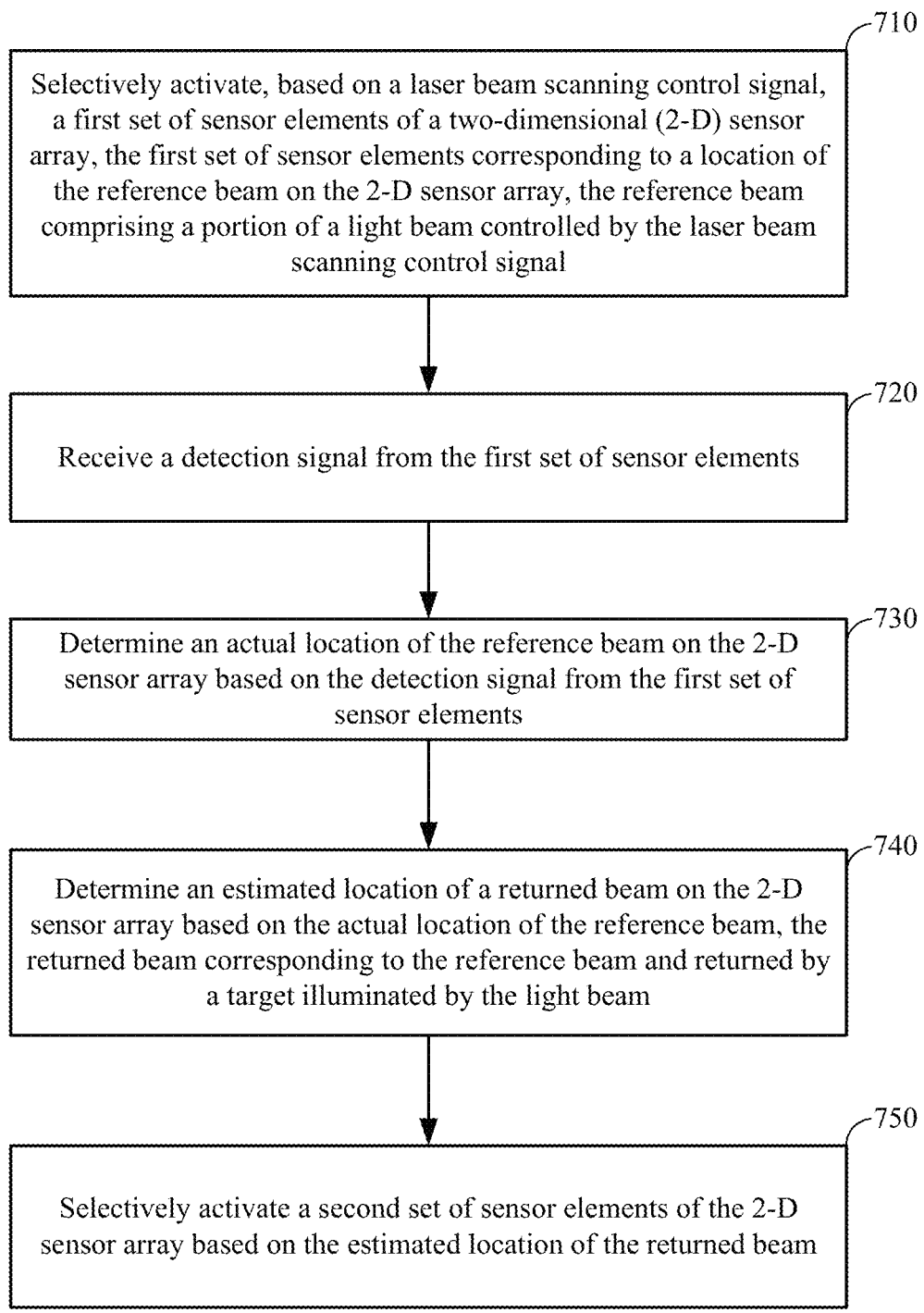
FIG. 7 is a flow chart illustrating an example method for measuring a reference beam and a corresponding returned beam from a target in a LIDAR system.

FIG. 7 is a flow chart 700 illustrating an example method for measuring a reference beam and a corresponding returned beam from a target in a LIDAR system. It is noted that the disclosed method may be used in systems other than a LIDAR system, for example, inspection systems.

At block 710, a first set of sensor elements corresponding to a reference beam may be selectively activated on a 2-D sensor array, for example, based on a laser beam scanning control signal. The reference beam may be a portion of a transmitted beam reflected or otherwise returned by a transmitter optical subsystem (e.g., transmitter optical subsystem 430) or a separate beam splitting device (e.g., beam splitting device 420) of the LIDAR system. In some embodiments, the first set of sensor elements may be selected using a pre-determined or calibrated relationship between the laser beam scanning control signals and the corresponding expected location and/or pattern of the reference beam on the 2-D sensor array. The number of sensor elements and the spatial arrangement of the first set of sensor elements may vary for different laser beam scanning control signals or different scanning directions. When the first set of sensor elements is activated, other sensor elements of the 2-D sensor array be turned off, deactivated, or put into a sleep or standby mode. In various embodiments, means for performing the function at block 710 may include, but are not limited to, for example, sensor controller 480, de-mapping circuit 482, and 2-D sensor array 460 of FIG. 4, or computing system 800 as illustrated in FIG. 8 and described in detail below.

At block 720, detection signals from the first set of sensor elements may be received by, for example, sensor controller 480 of FIG. 4. The detection signals from the first set of sensor elements may be pre-processed by, for example, ADC/TDC 470 of FIG. 4 as described above, before being sent to sensor controller 480. In some embodiments, the detection signal from each sensor element (e.g., SPAD micro-cell) may be individually transmitted and processed. The first set of sensor elements may also be grouped into a pixel, and the accumulated detection signals from the first set of sensor elements may be transmitted and processed together. In various embodiments, means for performing the function at block 720 may include, but are not limited to, for example, sensor controller 480, ADC/TDC 470, and 2-D sensor array 460 of FIG. 4, or computing system 800 as illustrated in FIG. 8 and described in detail below.

At block 730, an actual location of the reference beam on the 2-D sensor array may be determined based on the detection signals, for example, based on the locations of the sensor elements that detect the reference beam. In various embodiments, means for performing the function at block 730 may include, but are not limited to, for example, sensor controller 480 of FIG. 4 or computing system 800 as illustrated in FIG. 8 and described in detail below.

Figure 8:
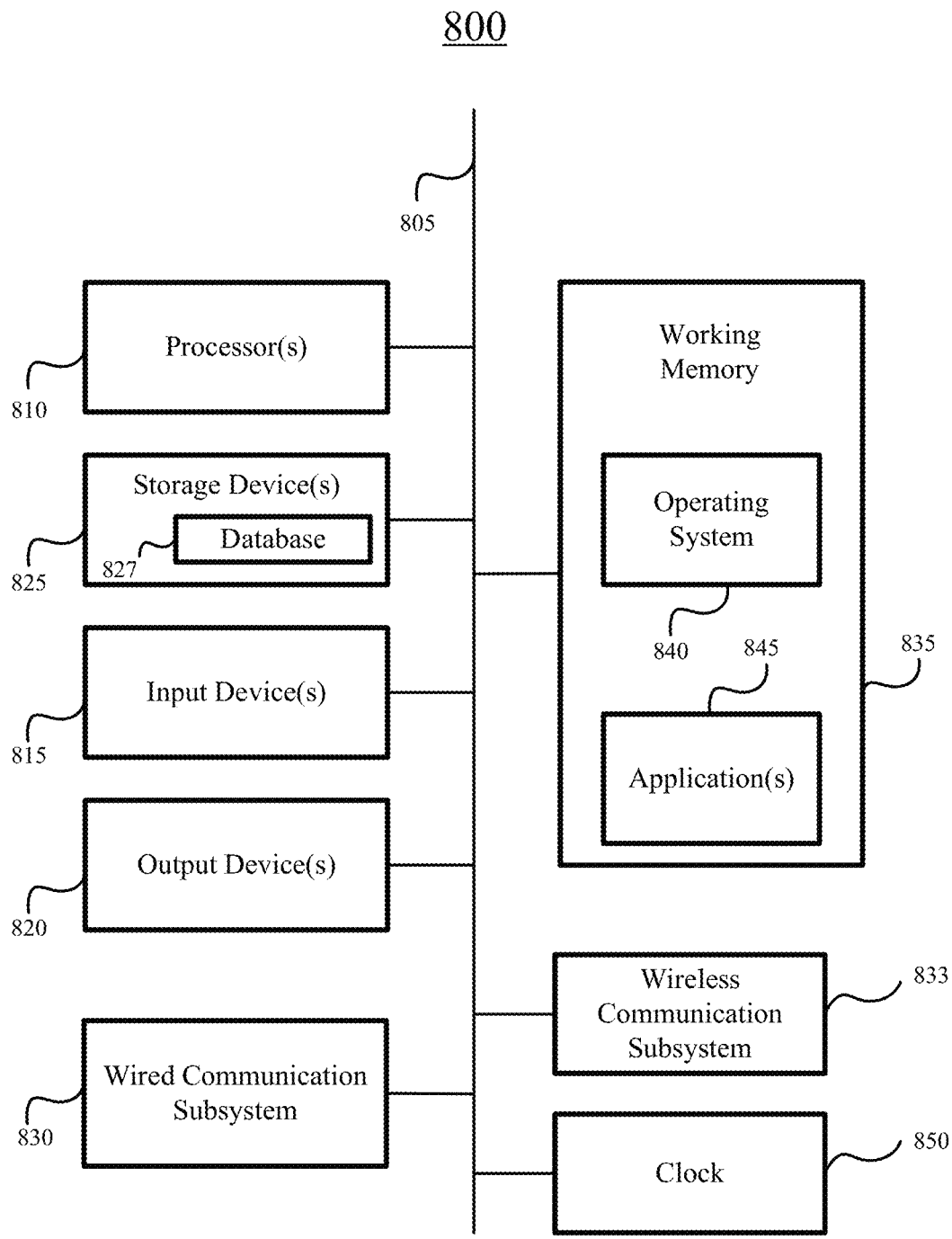
FIG. 8 is a block diagram of an example computing system for implementing some of the examples described herein.

At block 740, an estimated location of a returned beam on the 2-D sensor array may be determined based on the determined actual location of the reference beam, for example, by sensor controller 480 of FIG. 4 or computing system 800 as illustrated in FIG. 8 and described in detail below. The returned beam corresponds to the reference beam, and may be reflected or otherwise returned by the target object illuminated by the transmitted beam. The optical system of the LIDAR system may be configured such that the location of the reference beam on the 2-D sensor array and the location of the returned beam on the 2-D sensor array are spaced apart, for example, located at opposite sides of the 2-D sensor array with respect to a center of the 2-D sensor array. In some embodiments, the pattern of the light spot of the corresponding returned beam on the 2-D sensor array may also be estimated. In various embodiments, the estimated location and pattern of the corresponding returned beam may be determined based on a pre-determined (e.g., pre-measured or calibrated) relationship between the location of the return beam and the location of the reference beam.

At block 750, a second set of sensor elements of the 2-D sensor array may be selectively activated based on the estimated location of the corresponding returned beam. As described above, the number of sensor elements and the spatial arrangement of the second set of sensor elements may vary. For example, the second set of sensor elements may be arranged in an area of a desired shape with a desired dimension, such as a circle, an oval, a rectangle, or a square. The second set of sensor elements may cover an area larger than the estimated location of the returned beam. In various embodiments, means for performing the function at block 750 may include, but are not limited to, for example, sensor controller 480, de-mapping circuit 484, and 2-D sensor array 460 of FIG. 4, or computing system 800 as illustrated in FIG. 8 and described in detail below.

It is noted that even though FIG. 7 describes the operations as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

For example, even though not shown in FIG. 7, detection signals from the second set of sensor elements may be summed, pre-processed by an ADC/TDC circuit, and sent to a return beam analyzer as described above with respect to FIG. 4. Timing information and/or intensity information of the returned beam and/or the reference beam may be extracted from the detection signals from the second set of sensor elements and/or the detection signals from the first set of sensor elements. The timing information and intensity information of the detection signals from the second set of sensor elements, and the timing information of the detection signals from the first set of sensor elements (or the timing information of the transmitted beam from a laser beam steering controller, such as laser beam steering controller 405) may be used to determine the distance and/or other characteristics of the target object that caused the transmitted beam to be returned to the 2-D sensor array, such as the reflectivity and/or the material of the target object.

FIG. 8 illustrates components of an example computing system 800 for implementing some of the examples described herein. For example, computing system 800 can be used as processor/controller 210 of FIG. 2, signal processor 395 of FIG. 3, or laser beam steering controller 405, sensor controller 480, or return beam analyzer 490 of FIG. 4. It should be noted that FIG. 8 is meant only to provide a generalized illustration of various components, any or all of which may be utilized as appropriate. Moreover, system elements may be implemented in a relatively separated or relatively more integrated manner.

Computing system 800 is shown comprising hardware elements that can be electrically coupled via a bus 805 (or may otherwise be in communication, as appropriate). The hardware elements may include processor(s) 810, one or more input devices 815, and one or more output devices 820. Input device(s) 815 can include without limitation camera(s), a touchscreen, a touch pad, microphone(s), a keyboard, a mouse, button(s), dial(s), switch(es), and/or the like. Output devices 820 may include without limitation a display device, a printer, LEDs, speakers, and/or the like.

Processor(s) 810 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

Computing system 800 can also include a wired communication subsystem 830 and a wireless communication subsystem 833. Wired communication subsystem 830 and wireless communication subsystem 833 can include, without limitation, a modem, a network interface (wireless, wired, both, or other combination thereof), an infrared communication device, a wireless communication device, and/or a chipset (such as a Bluetooth™ device, an International Electrical and Electronics Engineers (IEEE) 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 800. Wired communication subsystem 830 and wireless communication subsystem 833 may include one or more input and/or output communication interfaces to permit data to be exchanged with a data network, wireless access points, other computer systems, and/or any other devices described herein.

Depending on desired functionality, wireless communication subsystem 833 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN.

Computing system 800 of FIG. 8 may include a clock 850 on bus 805, which can generate a signal to synchronize the various components on bus 805. Clock 850 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other devices while performing the techniques described herein.

Computing system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable and/or the like. Such storage devices may be configured to implement any appropriate data stores, including without limitation, various file systems, database structures, and/or the like. For instance, storage device(s) 825 may include a database 827 (or other data structure) configured to store detected signals, calibration results, and the pre-determined or calibrated relationship among laser beam steering signals, locations of the reference beam on the sensor array, and locations of the returned beam on the sensor array, as described in embodiments herein.

In many embodiments, computing system 800 may further comprise a working memory 835, which can include a RAM or ROM device, as described above. Software elements, shown as being currently located within working memory 835, can include an operating system 840, device drivers, executable libraries, and/or other code, such as one or more application programs 845, which may comprise software programs provided by various embodiments, and/or may be designed to implement methods, and/or configure systems, provided by other embodiments, as described herein, such as some or all of the methods described in relation to FIG. 7. Merely by way of example, one or more procedures described with respect to the method discussed above might be implemented as code and/or instructions executable by a computer (and/or a processor within a computer). In an aspect, such code and/or instructions can be used to configure and/or adapt a general-purpose computer (or other device) to perform one or more operations in accordance with the described methods.

A set of these instructions and/or code might be stored on a non-transitory computer-readable storage medium, such as non-transitory storage device(s) 825 described above. In some cases, the storage medium might be incorporated within a computer system, such as computing system 800. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 800 and/or might take the form of source and/or installable code, which, upon compilation and/or installation on computing system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, electrically erasable programmable read-only memory (EEPROM), compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A system comprising:
    a light source configured to transmit a light beam that scans in one or two dimensions;
    a two-dimensional (2-D) sensor array comprising a plurality of sensor elements;
    a beam splitting device configured to direct a first portion of the light beam as a reference beam onto a first area on the 2-D sensor array, wherein the first area changes as the light beam scans;
    a transmitter optical subsystem configured to direct a second portion of the light beam towards a target object;
    a receiver optical subsystem configured to direct a returned portion of the second portion of the light beam reflected by the target object onto a second area on the 2-D sensor array, the second area spaced apart from the first area and changing as the light beam scans; and
    a sensor controller communicatively coupled to the 2-D sensor array for controlling the 2-D sensor array by:
        measuring an actual location of the reference beam on the first area of the 2-D sensor array; and
        selectively activating sensor elements in the second area of the 2-D sensor array, based on the measured actual location of the reference beam in the first area on the 2-D sensor array,
        wherein the selectively activated sensor elements in the second area measure the returned portion of the second portion of the light beam reflected by the target object.

2. The system of claim 1, wherein the sensor controller is configured to:
    selectively activate a first set of sensor elements of the 2-D sensor array in a first estimated area comprising the first area, based on a laser beam scanning control signal that controls a scanning direction of the transmitted light beam;
    receive a detection signal from the first set of sensor elements;
    deactivate the first set of sensor elements after receiving the detection signal; and
    determine the actual location of the first portion of the light beam on the 2-D sensor array based on the detection signal.

3. The system of claim 2, further comprising a timing measurement circuit configured to extract timing information from the detection signal.

4. The system of claim 3, wherein the timing measurement circuit comprises an analog-to-digital converter or a time-to-digital converter.

5. The system of claim 2, wherein the sensor controller is further configured to:
    determine an estimated location of the returned portion of the second portion of the light beam on the 2-D sensor array, based on the measured actual location of the first portion of the light beam; and
    activate a second set of sensor elements of the 2-D sensor array based on the estimated location of the returned portion of the second portion of the light beam.

6. The system of claim 5, wherein the estimated location of the returned portion of the second portion of the light beam on the 2-D sensor array comprises a dimension and a pattern of the returned portion of the second portion of the light beam on the 2-D sensor array.

7. The system of claim 5, wherein the sensor controller is configured to determine the estimated location of the returned portion of the second portion of the light beam on the 2-D sensor array based on a relationship between the estimated location of the returned portion of the second portion of the light beam on the 2-D sensor array and the actual location of the first portion of the light beam on the 2-D sensor array.

8. The system of claim 5, wherein the sensor controller is further configured to:
Receive a detection signal from the second set of sensor elements; and
deactivate the second set of sensor elements after receiving the detection signal from the second set of sensor elements.

9. The system of claim 8, further comprising a measurement circuit configured to extract timing information and light intensity information from the detection signal from the second set of sensor elements.

10. The system of claim 9, further comprising an analyzer configured to determine a characteristic of the target object based on the timing information and the light intensity information.

11. The system of claim 1, wherein the sensor controller is configured to:
dynamically select a location, dimension, and pattern of an area of the 2-D sensor array; and
dynamically activate a set of sensor elements in the selected area of the 2-D sensor array and deactivate other sensor elements of the 2-D sensor array.

12. The system of claim 11, wherein the selected area comprises one of a circular area, a rectangular area, and an oval area of the 2-D sensor array.

13. The system of claim 1, wherein the 2-D sensor array comprises a silicon photomultiplier (SiPM) sensor comprising a plurality of single-photon avalanche diode (SPAD) micro-cells.

14. The system of claim 1, wherein the transmitter optical subsystem comprises the beam splitting device.

15. The system of claim 1, wherein the first area and the second area are on opposite sides of the 2-D sensor array.

16. A method for measuring a reference beam and a corresponding returned beam from a target, the method comprising:
selectively activating, based on a laser beam scanning control signal, a first set of sensor elements of a two-dimensional (2-D) sensor array, the first set of sensor elements corresponding to a location of the reference beam on the 2-D sensor array, the reference beam comprising a portion of a light beam controlled by the laser beam scanning control signal;
receiving a detection signal from the first set of sensor elements;
measuring an actual location of the reference beam on the 2-D sensor array based on the detection signal from the first set of sensor elements;
determining an estimated location of the returned beam on the 2-D sensor array based on the measured actual location of the reference beam, the returned beam returned by the target illuminated by the light beam; and
selectively activating a second set of sensor elements on the 2-D sensor array, based on the estimated location of the returned beam, wherein the selectively activated second set of sensor elements measure the returned beam returned by the target.

17. The method of claim 16, wherein:
the reference beam is directed to the 2-D sensor array by a beam splitting device;
the returned beam is directed to the 2-D sensor array by a receiver optical subsystem; and
the actual location of the reference beam on the 2-D sensor array is spaced apart from the estimated location of the returned beam on the 2-D sensor array.

18. The method of claim 16, further comprising:
deactivating the first set of sensor elements after receiving the detection signal from the first set of sensor elements; and
extracting timing information from the detection signal from the first set of sensor elements.

19. The method of claim 16, further comprising:
receiving a detection signal from the second set of sensor elements;
deactivating the second set of sensor elements after receiving the detection signal from the second set of sensor elements; and
extracting timing information from the detection signal from the second set of sensor elements.

20. The method of claim 19, wherein extracting timing information from the detection signal from the second set of sensor elements comprises extracting timing information from the detection signal from the second set of sensor elements using an analog-to-digital converter or a time-to-digital converter.

21. The method of claim 19, further comprising determining a characteristic of the target based on the timing information extracted from the detection signal from the second set of sensor elements.

22. The method of claim 16, wherein determining the estimated location of the returned beam on the 2-D sensor array comprises determining the estimated location of the returned beam on the 2-D sensor array based on a relationship between the estimated location of the returned beam on the 2-D sensor array and the actual location of the reference beam on the 2-D sensor array.

23. An apparatus comprising:
means for selectively activating, based on a laser beam scanning control signal, a first set of sensor elements of a two-dimensional (2-D) sensor array, the first set of sensor elements corresponding to a location of a reference beam on the 2-D sensor array, the reference beam comprising a portion of a light beam controlled by the laser beam scanning control signal;
means for receiving a detection signal from the first set of sensor elements;
means for measuring an actual location of the reference beam on the 2-D sensor array based on the detection signal;
means for determining an estimated location of a returned beam on the 2-D sensor array from a target based on the measured actual location of the reference beam, the returned beam corresponding to the reference beam and returned by the target illuminated by the light beam; and
means for selectively activating a second set of sensor elements on the 2-D sensor array, based on the estimated location of the returned beam, wherein the selectively activated second set of sensor elements measure the returned beam returned by the target.

24. The apparatus of claim 23, further comprising:
means for directing the reference beam to the 2-D sensor array; and
means for directing the returned beam to the 2-D sensor array on a location spaced apart from the actual location of the reference beam on the 2-D sensor array.

25. The apparatus of claim 23, further comprising:
means for deactivating the first set of sensor elements after receiving the detection signal from the first set of sensor elements; and
means for extracting timing information from the detection signal from the first set of sensor elements.

26. The apparatus of claim 23, further comprising:
means for receiving a detection signal from the second set of sensor elements;
means for deactivating the second set of sensor elements after receiving the detection signal from the second set of sensor elements; and
means for extracting timing information from the detection signal from the second set of sensor elements.

27. The apparatus of claim 26, further comprising means for determining a characteristic of the target based on the timing information extracted from the detection signal from the second set of sensor elements.

28. A non-transitory computer-readable storage medium comprising machine-readable instructions stored thereon, the instructions, when executed by one or more processors, causing the one or more processors to:
selectively activate, based on a laser beam scanning control signal, a first set of sensor elements of a two-dimensional (2-D) sensor array, the first set of sensor elements corresponding to a location of a reference beam on the 2-D sensor array, the reference beam comprising a portion of a light beam controlled by the laser beam scanning control signal;
receive a detection signal from the first set of sensor elements;
measuring an actual location of the reference beam on the 2-D sensor array based on the detection signal;
determine an estimated location of a returned beam on the 2-D sensor array from a target based on the measured actual location of the reference beam, the returned beam corresponding to the reference beam and returned by the target illuminated by the light beam; and
selectively activate a second set of sensor elements on the 2-D sensor array, based on the estimated location of the returned beam, wherein the selectively activated second set of sensor elements measure the returned beam returned by the target.

29. The non-transitory computer-readable storage medium of claim 28, wherein the instructions, when executed by the one or more processors, further cause the one or more processors to:
receive a detection signal from the second set of sensor elements;
deactivate the second set of sensor elements after receiving the detection signal from the second set of sensor elements; and
extract timing information and light intensity information from the detection signal from the second set of sensor elements.

30. The non-transitory computer-readable storage medium of claim 29, wherein the instructions, when executed by the one or more processors, further cause the one or more processors to:
determine a characteristic of the target based on the timing information and the light intensity information extracted from the detection signal from the second set of sensor elements.

* * * * *